(12) United States Patent
Baugh et al.

(10) Patent No.: US 6,466,257 B1
(45) Date of Patent: Oct. 15, 2002

(54) METHOD AND TOOL FOR MEASUREMENT OF ROLL STATIC ATTITUDE OF SLIDERS IN A MAGNETIC RECORDING HEAD STACK ASSEMBLY

(75) Inventors: Eric Gordon Baugh; Myron Dale Flickner; Robert Edward Fontana, Jr., all of San Jose; Stephen Arnold Olson, Palo Alto; Gurinder Pal Singh, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,020

(22) Filed: Nov. 1, 1999

(51) Int. Cl.⁷ .............................. H04N 9/47; H04N 7/18
(52) U.S. Cl. ........................ 348/95; 348/94; 382/151; 382/218
(58) Field of Search ................. 348/95, 94; 29/603.03, 29/603.04, 603; 382/151, 218

(56) References Cited

U.S. PATENT DOCUMENTS

| | | | |
|---|---|---|---|
| 5,471,734 A | * 12/1995 | Hatch | 29/603 |
| 5,588,200 A | 12/1996 | Schudel | 29/603.01 |
| 5,636,013 A | 6/1997 | Swift | 356/3.03 |
| 5,682,780 A | 11/1997 | Girard | 72/16.2 |
| 5,712,463 A | 1/1998 | Singh et al. | 219/121.6 |
| 6,052,890 A | * 4/2000 | Malagrino | 29/603.03 |
| 6,154,952 A | * 12/2000 | Tangren | 29/603.04 |
| 6,195,454 B1 | * 2/2001 | Yazawa | 382/151 |
| 6,295,374 B1 | * 9/2001 | Robinson | 382/218 |

\* cited by examiner

Primary Examiner—Chris Kelley
Assistant Examiner—Charles Parsons
(74) Attorney, Agent, or Firm—Lumen Intellectual Property Services, Inc.

(57) ABSTRACT

A method and tool for measurement of the roll static attitude and y-misalignment of magnetic recording sliders within the head stack assembly having reference elements placed on the deposited end of the magnetic recording slider, which are optically analyzed by a video camera connected to a computer. For fast measurement the head stack assembly is clamped in a fixture mounted on motorized stages, which move each slider into the measurement position. In a two step imaging and analyzing process, the orientation and location of one or more edges of the reference element are computed and compared with known control parameters.

20 Claims, 5 Drawing Sheets

METHOD AND TOOL FOR MEASUREMENT OF ROLL STATIC ATTITUDE OF SLIDERS IN A MAGNETIC RECORDING HEAD STACK ASSEMBLY

FIELD OF INVENTION

This invention relates to the field of measurement of orientation and location of magnetic recording sliders within a head stack assembly.

BACKGROUND OF THE INVENTION

In a hard disk drive there are one or more disks rotating on a common spindle, which store magnetic information on their surfaces. For each magnetic surface a suspension or Head Gimbal Assembly (HGA) is provided. A HGA consists of a slider, a flexure, a load beam, a mount plate, and electrical leads, which carry signals to and from the head. The slider has a read/write head, which magnetizes small areas or domains on the surface of the disk. Typically, these magnetized areas are organized in the form of tracks (e.g., concentric tracks). The slider also has an air bearing surface (ABS) fabricated on the side facing the disk. The shape of the ABS generates a pressure distribution underneath the slider as air is dragged between the slider and rotating disk; this pressure distribution tends to push the slider away from the disk. The slider is connected to the load beam via a flexure, which is a flexible member that allows the slider to pivot in the pitch (transverse axis) and roll (longitudinal axis) directions. The load beam imposes a counteracting force onto the slider to balance the pressure force. The counteracting force is called the "gram load". A method to support the HGA's over the disks is to attach them on a single metallic piece with multiple arms. The metallic piece commonly known as an actuator is pivoted around a bearing so that the magnetic read/write elements on the slider reach various areas of the magnetic surface of the disk. A set of HGA's mounted on an actuator is called a Head Stack Assembly (HSA). The actuator arm has a sufficient length such that the mounted HGA's reach to the very inside tracks of the disk. Every HGA within a HSA needs to be precisely aligned relative to each other to ensure that all sliders can access the maximum allowable area on the disk. The symmetry axis, at which each HGA emanates radially from the pivot axis of the actuator is called the longitudinal or x-axis. The y-axis as the second axis is perpendicular to the x-axis and parallel to the disk surfaces. The magnetic elements of all sliders in the HSA need to be aligned to the same y-position to a close tolerance. Any deviation from the specified y-position is called y-misalignment. It is caused either by misalignment of the slider on the load beam or misalignment of the HGA on the actuator arm. One of the objectives of the current invention is to measure any y-misalignment of the sliders.

The distance between the read/write head and the disk surface is called the "flying height". It is typically below 100 nm. The main factors that affect the flying height are: the gram load, the nature of the ABS, the mounting of the slider on the flexure, the mounting of the HGA on the HSA, and the Roll Static Attitude (RSA) of the slider. RSA is a tilting of the slider around the x-axis in a free state before it is flying over the disk and can change during the HSA assembly process.

Magnetic recording is a "near-field" process, whereby the reading and writing by the read/write head occurs in close proximity to the disk surface. To increase the areal density, it is essential to reduce the average flying height and flying height variations of the sliders, which hold the magnetic recording heads. Unintentioned alterations of the RSA and the y-misalignment during the manufacturing of head stack assemblies change the aerodynamic properties of the air bearing surface and the even distribution of the gram load thereon. RSA and y-misalignment of the sliders occur especially during the handling and the swaging process by which the HGA is attached to the actuator. Both result in flying heights and flying height variations that can exceed the predetermined limits. To minimize these alterations, tight manufacturing tolerances and a reliable quality control are necessary.

U.S. Pat. No. 5,588,200 for instance describes a method and tool to examine individual suspension assemblies or HGA's. In the disclosed method an auto-focus vision system takes perpendicular distance measurements of several reference points of the air bearing surface of one slider. These reference points define a plane whose orientation and location are compared with control parameters. This method is space-consuming, because it requires the user to access the air bearing surface along at least one perpendicular or near-perpendicular direction. The close distance between the sliders in a head stack assembly make the air bearing surfaces inaccessible for the auto-focus vision system. The disclosed method is therefore of no use for post-assembly control.

U.S. Pat. No. 5,636,013 discloses methods to take measurements on the HGA level of orientation and z-location of sliders or suspension parts close to the slider. The z-location is recognized as a distance perpendicular to the air bearing surface of the slider. The reflection angle of a laser beam directed onto an optically reflective surface is thereby used to retrieve information about the sliders orientation. The z-location is measured simultaneously by an autofocusing system. This method is space-consuming, because it requires the user to access the air bearing surface along at least one perpendicular or near-perpendicular direction. This method is not useable for measurements on a head stack assembly for the same reasons as described under US. Pat. No. 5,588,200.

The general use of the air bearing surface as reference plane for control measurements is limited by additional incorporated three dimensional features. The air bearing surface controls the floating performance of the slider on the air stream driven by the spinning disk surface. It has more and more channels, pads and other three dimensional features added as the state of the art advances. Hence, the quality of the reflection is reduced. The reduced reflection quality in addition to limited available space between sliders within a head stack assembly make the direct optical access to the air bearing surfaces for maeasurements in the head stack assembly highly impractical.

An instrument based on U.S. Pat. No. 5,636,013 and marketed by Brumco Inc. performs the measurements on sliders within a head stack assembly. The instrument uses a miniature mirror placed between two air bearing surfaces. The mirror deflects a laser beam onto the air bearing surface, captures and transmitts the reflection via an optical lens system onto a scale. There it can be inspected. In the practical use of this instrument the variation of the measurement results exceeds the orientation and location tolerances of the sliders to be analyzed.

There is a need for a reliable and precise method and apparatus to measure the amount of RSA and the y-misalignment of each individual slider within the finished head stack assembly. The method and tool needs to be utilized for intermediate quality control within an industrial disk manufacturing. This application discloses such a solution.

OBJECTS AND ADVANTAGES

Accordingly, it is a primary object of the present invention to provide an apparatus and a method to measure the y-misalignment and roll static attitude of sliders within a head stack assembly.

It is a further object of the present invention to utilize a geometric element on the deposited end of the slider with a predetermined position and orientation to provide a reference for the measurement process.

It is another object of the present invention to provide a fixture having an assisting mechanism for aiding in the measurement process.

It is an additional object of the present invention to provide an automated apparatus to systematize the measurement process.

The above objects and advantages, as well as numerous improvements attained by the apparatus and method of the invention are pointed out below.

SUMMARY

The method and apparatus or tool for measurement of roll static attitude and y-misalignment of a magnetic recording slider within the head stack assembly comprises one or more reference elements placed on the deposited end of the magnetic slider and a fixture to hold the head stack assembly in a feasible measurement position on an automated measurement instrument. One method to fabricate reference elements is to lithographically align and co-sputter them together with the lapping guides that define the orientation of the air bearing surface of the slider during the ABS lapping process. Prior art measurements are made directly on the air bearing surface which is not easily accessible at the HSA level. In our invention, measurements are made using reference elements on the deposited end of the slider, which is easily visible even at the HSA level.

The automated measurement instrument in its preferred embodiment has a video camera, a focusing device, a pair of motorized stages, an oblique light source, and a computer. The motorized stages move the fixture with the clamped head stack assembly in a plane perpendicular to the optical axis of the video camera, bringing each slider in turn into the field of view of the camera. The computer is connected to the video camera and the motorized stages and controls them in a predetermined way.

During the calibration process, the motorized stages bring a reference edge of the fixture into the field of view of the camera. The reference edge is parallel to the axis of the bearing shaft of the head stack assembly and perpendicular to a reference orientation of the nominal roll position of the sliders in the head stack assembly. The orientation of the reference edge remains usually constant during the continuous operation of the apparatus. The reference edge has to be measured only in situations, when the camera position has changed, or when the fixture cannot be repeat ably remounted on the motorized stages within an angular tolerance that is smaller than the resolving limit of the described measurement system. The measurement process recognizes an angular difference between the reference orientation and the actual angle of the slider. The angular difference is referred to as the roll static attitude. The measurement process follows consecutive steps. To make a preadjustment on the apparatus for the predetermined field of view a precision machined reference part for example can be placed in the apparatus instead of an actual head stack assembly. The actual process begins with the clamping of the head stack assembly onto the fixture, which is afterward arrested on the motorized stages. The first magnetic recording slider is positioned with its reference element under the video camera, which takes an image of it. The location of the reference element in the field of view is found by a pattern recognition process using normalized correlation that is well known in the field of computerized machine vision. The roll static attitude and the position of each slider along the y-axis is consecutivly determined. Relative to the location of the reference element, two selected areas of the captured image are processed by the computer to determine a first approximation of the orientation of the reference element. This is accomplished by determining the position of the average edge location in each of the two selected areas, then determining the angle between those two positions relative to the reference edge. The first approximation is used in a second refined processing operation to define a starting point and to analyze a narrow fraction of the captured image. The used algorithm is similar to that disclosed in U.S. Pat. No. 5,136,660. Therein an algorithm is described for high precision measurement of angular orientation of edges. In this algorithm, a response function (maximum gradient of the Radon projection) is produced as a function of a number of test angles. The patented algorithm is applied in the current disclosure on the angle determined during the first approximation. The maximum of the response function corresponds to the angular orientation of the edge in the image under analysis. The reference element is preferably made from sputtered metal having a grain size very small in comparison to the pixel resolution of the imaging device. In lieu of a sputtered reference element, existing geometrical features on the slider such as electrical leads made from plated copper may be used; these, however, tend to have a large grain size and degrade the accuracy of the measurement. This degradation may be partially offset by using computationally more intensive algorithms as described in this document.

The reference element is preferably made from deposited copper lead with a grain size, that is relative large in respect to the pixel size of the captured image. As a result, the response function can be jagged. To generate a smooth response function, a parabolic fit is added to the patented algorithm, whereby the angle corresponding to the peak of the parabola is the final output of the algorithm.

In a following step the computer actuates the motorized stages to move the fixture with the head stack assembly until the reference element of the adjacent magnetic recording slider is placed under the video camera and the analyzing process can be repeated.

DETAILED DESCRIPTION OF THE FIGURES

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
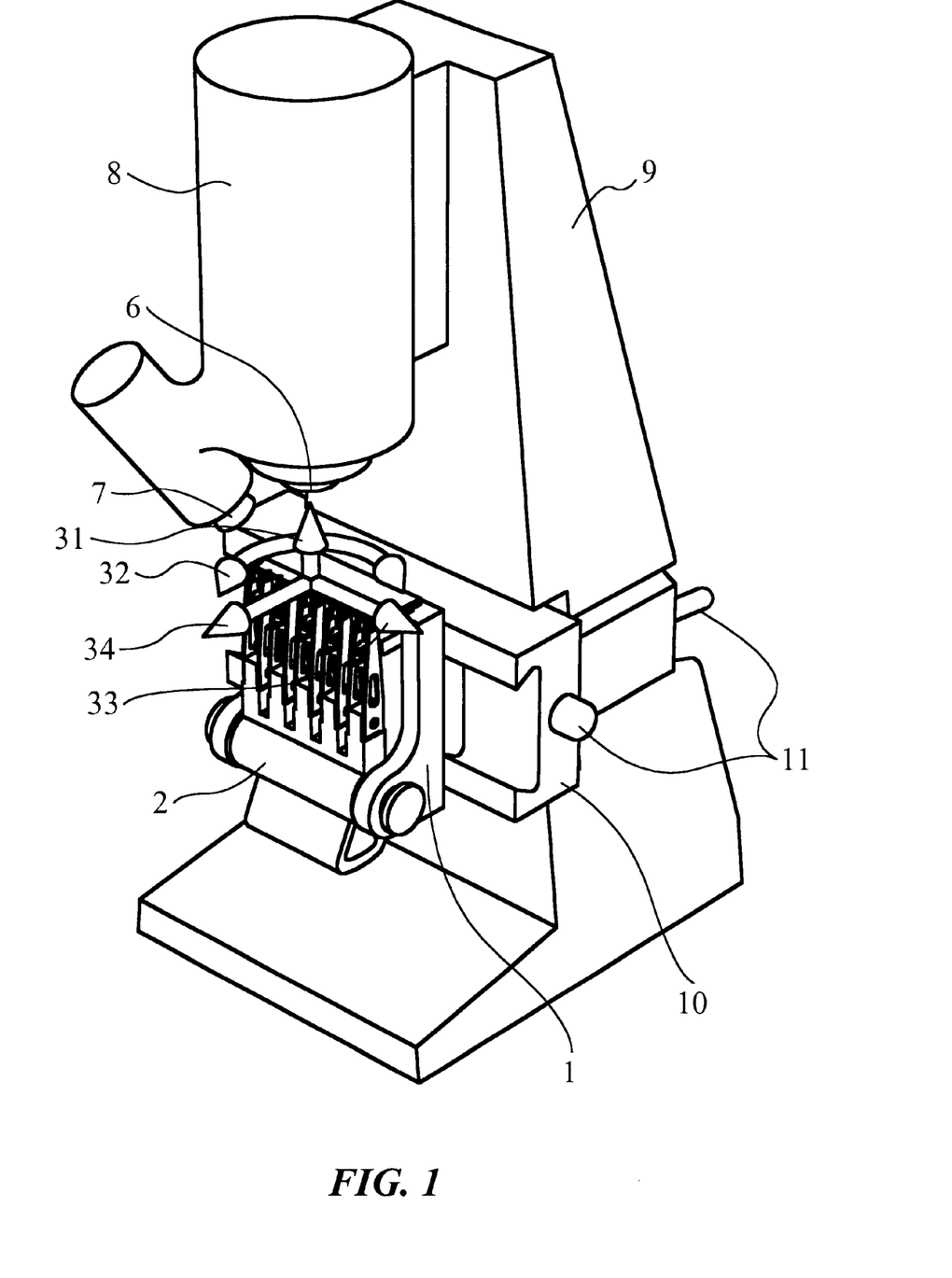
FIG. 1 shows a perspective view of the preferred embodiment of the invention including all main elements.

A preferred embodiment of the invention is shown in FIG. 1 in a perspective view of an apparatus comprising a fixture 1 for holding a head stack assembly 2 on motorized stages 10. The head stack assembly 2 has a coordinate system defined by a x-axis 31, a y-axis 34 and a z-axis 33. The head stack assembly 2 is fixed in vertical position on the fixture 1 and the coordinate system is tilted vertically therewith. The motorized stages 10 are computer controlled and move the head stack assembly 2 with stage drives 11 along the y-axis 34 and the z-axis 33. An optical recognition device (preferably a video camera) 8 with an optical lens system 6 and an oblique light source 7 is mounted on a frame 9 opposing the head stack assembly 2. The optical recognition device 8 registers optical information preferably from still gray scale images of a preferred area of the deposited end of each slider. Those still images are transmitted to a connected computer (not shown) for processing.

This example of an apparatus is to be used to analyze the manufactured head stack assembly 2 before it is assembled with other pre-manufactured components to a functional hard disk drive. There is a special need to determine if the physical placement of the miniature magnetic recording sliders within the head stack assembly is within a predetermined tolerance. The time period of the whole measurement process has to be minimized to keep the disruption of the assembly process of the whole hard disk drive to a minimum and the sampling rate to a maximum. To meet these demands, the measurement process runs in several automated steps, which can be altered and adjusted to the specific needs of different designs of head stack assemblies.

The measurement process begins with attaching the head stack assembly 2 onto the fixture 1. The fixture locates the head stack assembly in the x-axis 31, the y-axis 34 and the z-axis 33 by engaging various tooling points and datum surfaces of the head stack assembly 2. It is clear to one skilled in the art that this fixture 1 can be the one already carrying the head stack assembly 2 from a previous manufacturing process thus avoiding the need to change the fixture 1 for the sole purpose of attaching the head stack assembly 2 onto the motorized stages 10. The fixture 1 comprises alignment and clamping features that correspond to features of the motorized stages 10. These features are known to one skilled in the art for engaging two parts in a precise and predetermined way.

After the head stack assembly 2 has been rigidly connected to the motorized stages 10, the automated measurement process is started. The computer gives a movement signal to the stage drives 11 urging the motorized stages 10 into a first predetermined measurement position.

After the head stack assembly 2 comes to rest in its first measurement position, an autofocus device positions the optical lens system 6 along the optical axis to obtain the sharpest image for the optical recognition means 8. It is important to capture the still images with the highest feasible quality to avoid distortions in the image due to poor focus.

An oblique light source 7 provides illumination of the designated measurement area to illuminate it with high contrast. A number of still images are taken by the optical recognition means 8 and transmitted to a computer for processing, whereby a y-misalignment in direction of the y-axis 34 and a roll static attitude 32 around the x-axis 31 are analyzed. After the images are captured, the motorized stages 10 move the head stack assembly 2 to the next position and the whole measurement process is repeated. After all the sliders in the head stack assembly 2 have been analyzed, a final protocol is produced to document the results.

Figure 2:
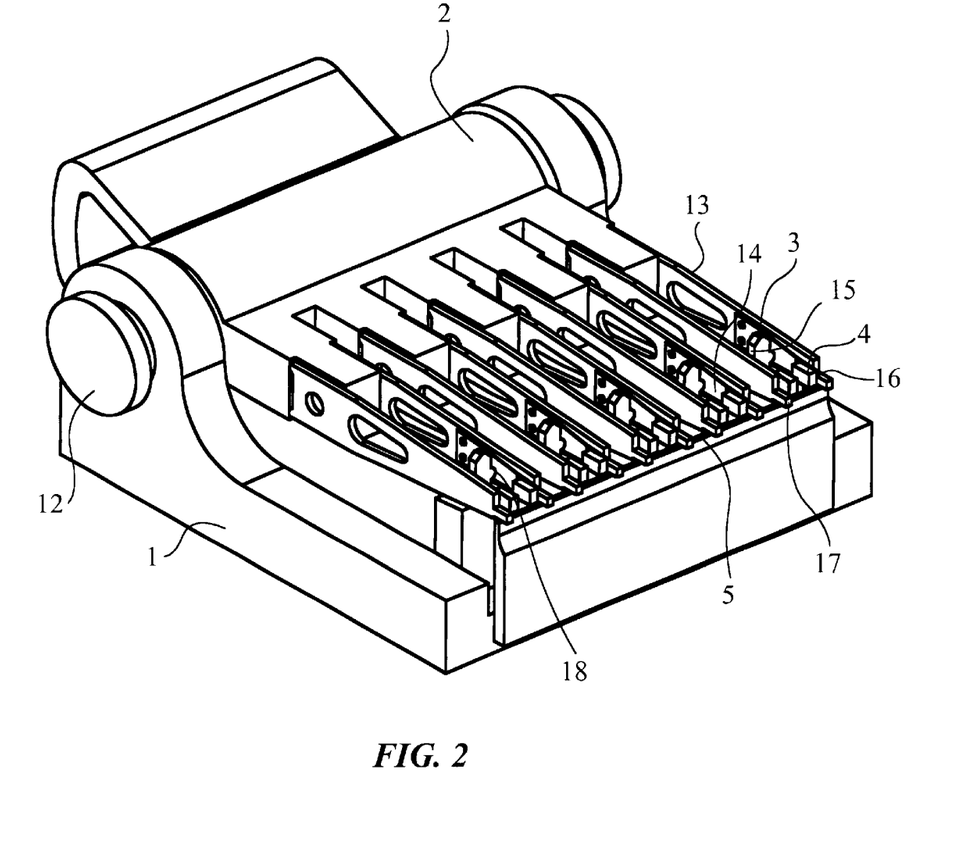
FIG. 2 shows a perspective view of the head stack assembly clamped in a fixture.

FIG. 2 shows a perspective view of the head stack assembly 2 clamped in fixture 1. A spring loaded clamp bolt 12 presses into a hollow spindle shaft of the actuator 2 and pushes it against a datum surface. The figure shows the head stack assembly 2 in simplified form displaying mainly the fragile area with a number of head gimbal assemblies in arrayed mounting position. Each of the head gimbal assemblies consists of a load beam 13 with a rigidly mounted flexure 14, which carries one slider 4. The flexure 14 is a very compliant sheet metal part that positions the slider 4 in a spring-loaded position on each load beam 13. The load beam 13 provides the stiff beam structure necessary to accomplish a reliable positioning of the magnetic recording slider 4 relative to the disk surface.

FIG. 2 further shows the fixture 1 with an example of a reference edge 5 and a comb block 3. The comb block 3 secures each individual load beam 13 and prevents the opposing air bearing surfaces 24 from coming together due to the gram load of each load beams 13. To avoid any unwanted torsion imposed by the comb block 3 onto the load beams 13, there can be further geometric features added in the form of support noses 18, which reach toward the load beams 13. Each of the support noses 18 is positioned within the fixture 1 to rest on the centerline of one of the load beams 13. The comb block 3 has also chamfered slot ends 15 to ease the entrapment of the head gimbal assemblies 13 in the comb block 3 during the fixation of the head stack assembly 2 within the fixture 1. It is clear to one skilled in the art, that the comb block 3 can be designed in a way to urge one or more magnetic recording sliders 4 into a predetermined position or orientation to accomplish a measurement process.

The reference edge 5 in the preferred embodiment provides a visual calibration feature close to the plane of the slider deposited ends 16. It is placed on the fixture 1 such that any physical contact with any part of the load beam is avoided.

Figure 3:
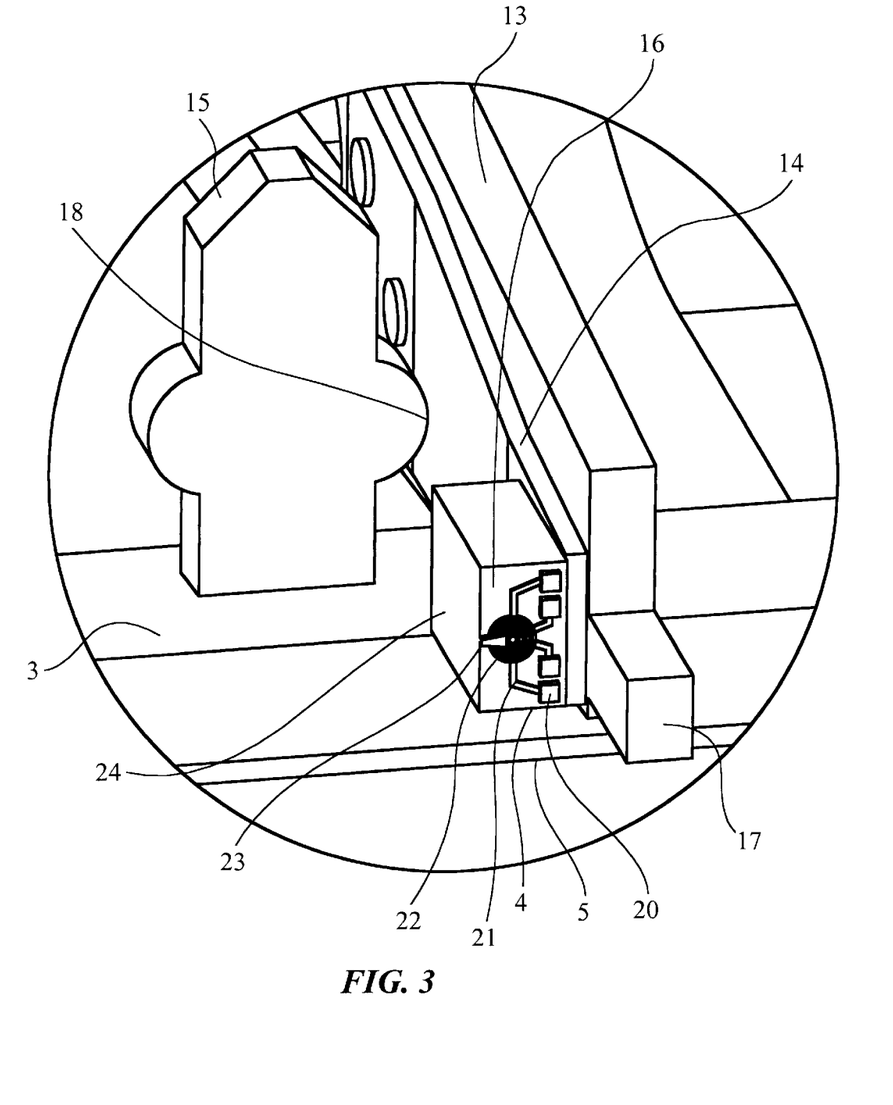
FIG. 3 shows a perspective detailed view from the approximate direction of the video camera onto one slider of the head stack assembly within the fixture.

FIG. 3 shows a perspective detailed view from the approximate direction of the optical recognition means 8 onto the head stack assembly 2 within the fixture 1. In this enlarged view one magnetic recording slider 4 is shown with functional details on its deposited end 16. The magnetic recording slider 4 is attached to the flexure 14. The small support nose 18 of the comb block 3 with its chamfered slot ends 15 is visible in close proximity to the flexure 14.

In the lower area of the FIG. 3 the reference edge 5 is shown in a horizontal orientation. The main functional features that occupy the available space of the deposited end 16 of a magnetic recording slider 4 are the read and write head 23, an electromagnetic coil 22, electrically conductive leads 21 and cable contacts 20 with connected transmission cables or wires (not shown). An air bearing surface 24 is shown in a somewhat perpendicular orientation to the reference edge 5. The air bearing surface 24 floats over the spinning disk surface on the air, which is compressed between the air bearing surface 24 and the disk surface. The lower flying heights achievable by adjusting the flying parameters require precise alignment of the air bearing surface 24 with the spinning disk surface. One parameter important for this alignment is the roll static attitude 32. For the purposes of this measurement, the roll static attitude 32 is an angular relation between the air bearing surface 24 and the reference edge 5.

The raw material for manufacturing sliders 4 is typically a thin disk of a two-component ceramic material (alumina/titanium-carbide), a so called wafer. On that wafer a number of sliders 4 are built up with their functional elements in rows and columns by adding shaped metal layers in lithography steps. During this procedure different kinds of metals are homogeneously applied and partially removed again by using protective masks against erosive removing processes. Metals with low electrical resistance are deposited by electroplating for the electrically conductive leads 21. These tend to have a granular structure (large grain size). The wafer is then cut in rows and the air bearing surfaces, with special three dimensional aerodynamic features, are formed. The electrically conductive leads 21 have a granular structure, that provides only a rough edge. Therefore, and because they are applied in a low precision manufacturing step they are of limited use as reference elements for the optical measurement.

It is therefore necessary to find a solution to place additional reference elements from a metal with small grain structure in a precise geometric orientation on the remaining free space on the deposited end 16 of the magnetic recording slider 4. The following FIG. 4 and FIG. 5 disclose such solutions.

Figure 4:
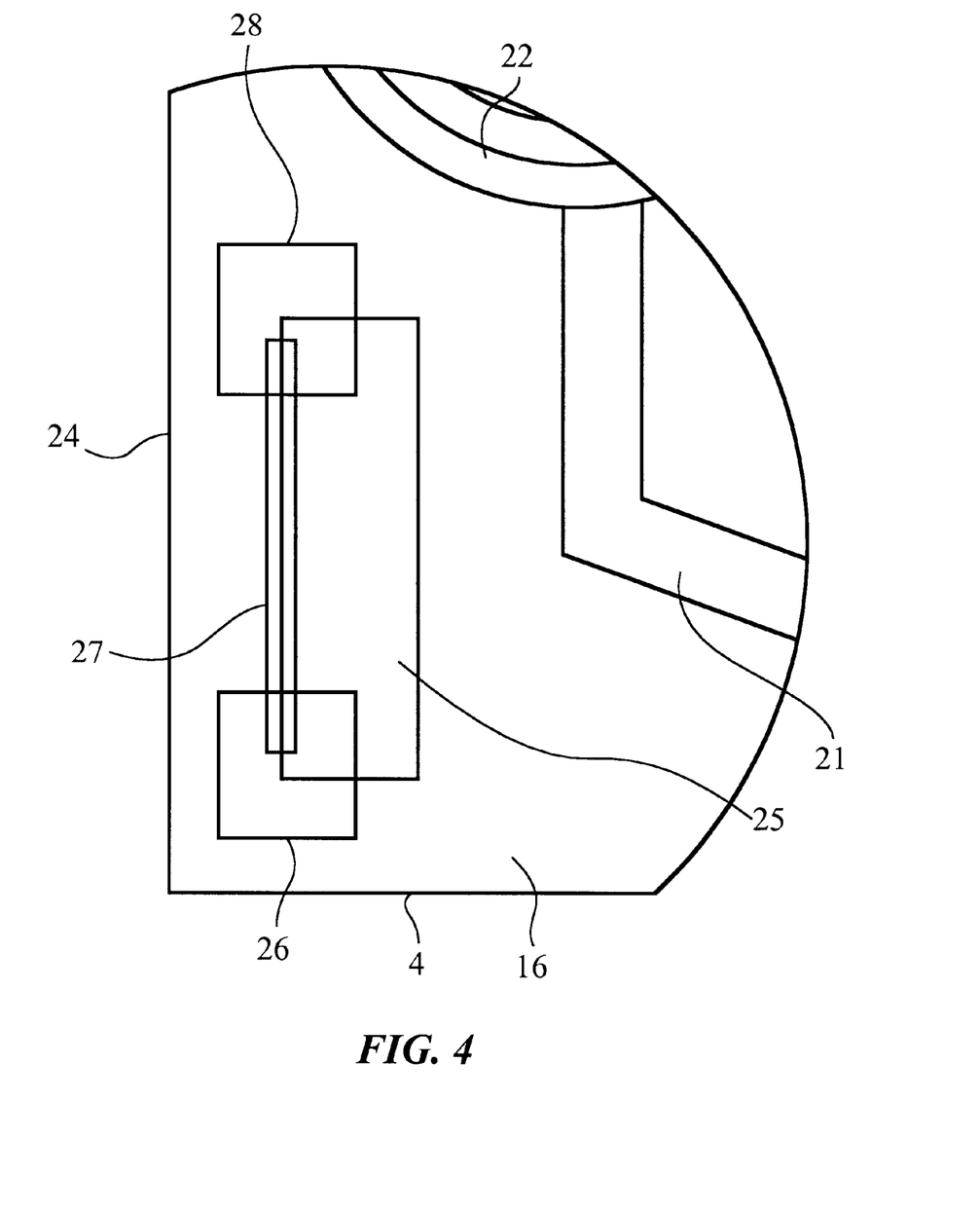
FIG. 4 shows a schematic view from the direction of the video camera onto a section of the back face of one slider with a reference element.

FIG. 4 shows a schematic view from the direction of the optical recognition means 8 of an optical reference element 25 placed on the deposited end 16 of the magnetic recording slider 4 next to electrically conductive lead 21 and the electromagnetic coil 22. It is desired to have the optical reference element 25 aligned to the air bearing surface back edge 24 with the closest achievable tolerance. Therefore the optical reference element 25 is applied in the same manufacturing step together with other reference elements. Preferably, reference element 25 is applied on the deposited end 16 together with the lapping guides. Lapping guides are resistive material portions applied on the wafer level as alignment features for manufacturing the air bearing surfaces on the row level and are well-known in the art. The technique of precision lithography ensures a very high degree of alignment between the reference element and the resistive lapping guides, which control the orientation of the air bearing surface.

During the measurement, the optical recognition means 8 takes a number of images of the optical reference element 25. The computer then analyzes a first initial measurement area 26 and a second initial measurement area 28. The positions of areas 26 and 28 in relation to the optical reference element 25 are determined during the setup of an analyzing software in accordance to the dimensions of the optical reference element 25. In this first rough analysis step simple and well-known image analysis techniques are used to obtain an initial approximation of the angular orientation of the reference element 25 based on the two initial measurement areas. Since the high precision algorithm is computationally intensive and needs to be kept to a feasible minimum, a second refined step analyzes only the narrow refined measurement area 27 with a high precision algorithm, which is based on the Radon transform. The high precision algorithm is resistant to distortions related to the grain structure of the metal used for the optical reference element 25. The distortions are filtered out both by the integrating nature of the Radon transform and the parabolic fitting step, leaving a smooth expression of the edge orientation with a precision finer than the grain size of the metal used for the optical reference element 25. The angle corresponding to the peak of the smooth expression is then compared with the orientation of the reference edge 5.

Figure 5:
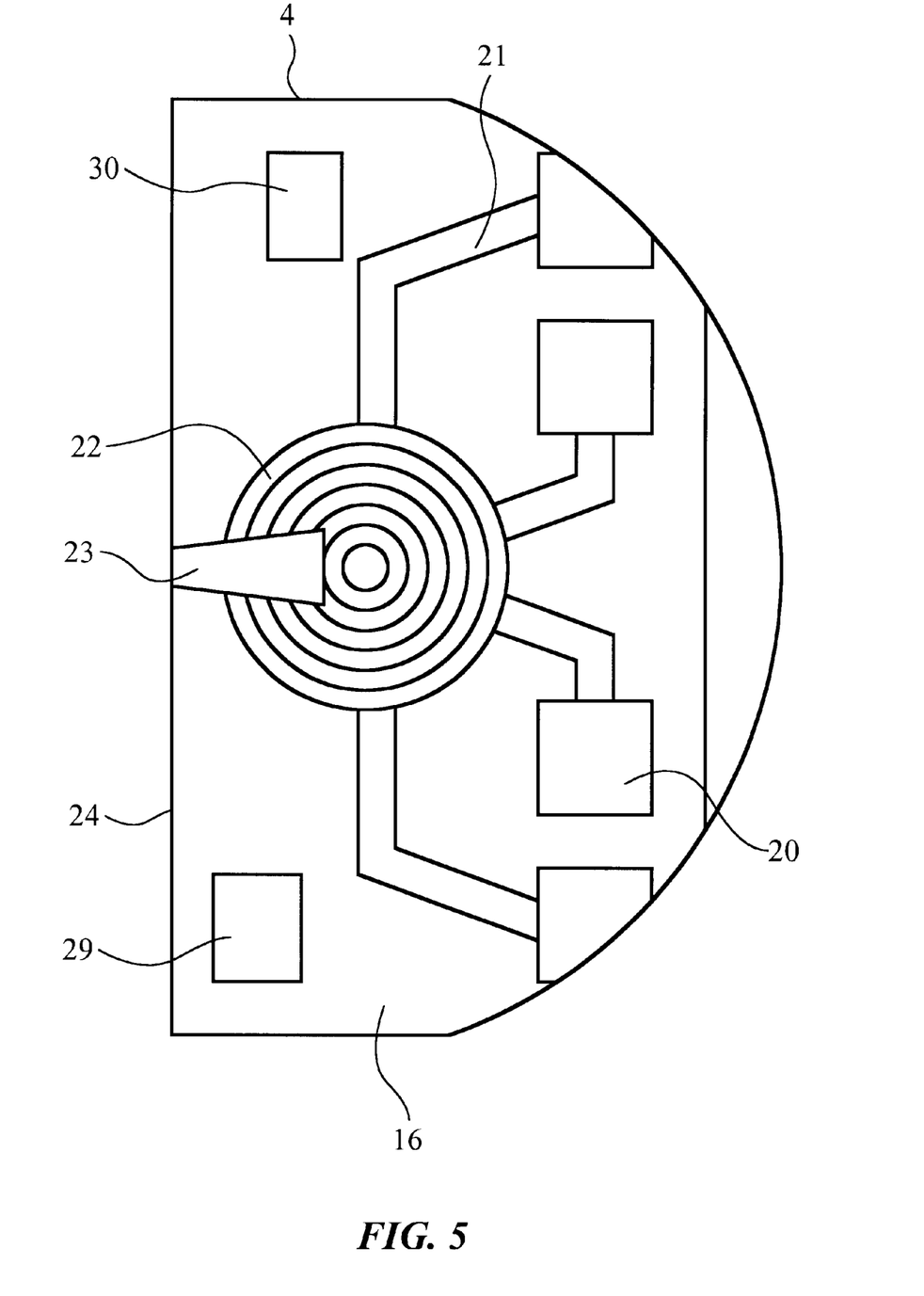
FIG. 5 shows a schematic view from the direction of the video camera onto a section of the back face of one slider with a variation of two reference elements.

FIG. 5 shows an alternate embodiment of the reference element. This figure is a schematic view from the direction of the optical recognition means 8 onto a section of the deposited end 16 of the slider 4. The alternate reference element comprises a first reference element section 29 and a second reference element section 30. The schematic view further shows electromagnetic coil 22, read/write head 23, electrically conductive leads 21 and contacts 20. Wires usually attached to contacts 20 are not shown. The available space on the slider deposited end 16 limits the spatial extent of the optical reference element 25 (as shown in FIG. 4). Since the lateral extent of the optical reference element 25 is crucial to high overall precision of the instant measurement process it is beneficial to split the optical reference element 25 (as shown in FIG. 4) into a first reference element section 29 and a second reference element section 30. The method to place sections 29, 30 on the deposited end 16 of slider 4 is the same as described for the optical reference element 25 under FIG. 4.

In this embodiment one or more images are captured with the optical recognition means 8 of the first and second reference sections 29, 30. During the computed analysis, first an estimated area around corner points of the first and second reference element section 29, 30 is analyzed to define narrow search boxes, which are then analyzed with a second high precision algorithm. The precise information about two corner points defines a line, which is interpreted as angular information in respect to the reference edge 5 with a precision proportional to the distance between the corner points. The first and second reference element section 29, 30 can be located at any free space of the deposited end 16 free of any geometric relation to each other.

What is claimed is:

1. An apparatus for measuring a roll static attitude and a y-misalignment of a slider having an air bearing surface and being mounted on a head gimbal assembly in a head stack assembly, said apparatus comprising:
   a) at least one optical reference element placed on said slider in alignment with said air bearing surface;
   b) a fixture for mounting said head stack assembly such that said slider is positioned with a predetermined roll bias, wherein said fixture comprises an engagement means for engaging said head gimbal assembly and wherein said engagement means further comprises a comb block for limiting a movement range of said head gimbal assembly;
   c) an optical recognition means for registering optical information about said optical reference element; and
   d) a processing means for processing said optical information to determine said physical placement.

2. The apparatus of claim 1, further comprising a means for moving said fixture with respect to said optical recognition means.

3. The apparatus of claim 1, wherein said at least one optical reference element is a metal element.

4. The apparatus of claim 3, wherein said slider has a deposited end face and said metal element is deposited on said back face.

5. The apparatus of claim 3, wherein said metal element comprises a number of metal sections.

6. The apparatus of claim 1, wherein said movement range is defined by further geometrical features for limiting said roll bias.

7. The apparatus of claim 1, wherein said optical recognition means is a video camera.

8. The apparatus of claim 7, further comprising an adjustment means for guiding said video camera.

9. The apparatus of claim 7, wherein said video camera generates a still image including said optical reference element.

10. The apparatus of claim 1, wherein said fixture further comprises at least one reference edge.

11. The apparatus of claim 1, wherein said head stack assembly comprises at least one reference edge.

12. The apparatus of claim 1, wherein said placement comprises a roll static attitude of said slider.

13. The apparatus of claim 1, wherein said predetermined roll bias is zero.

14. A method for measuring a physical placement of a slider having an air bearing surface and being mounted on a head gimbal assembly in a head stack assembly, said method comprising the following steps:
  a) applying an optical reference element on said slider in alignment with said air bearing surface, wherein said optical reference element is deposited in an alignment with a lapping guide of said slider;
  b) providing a fixture;
  c) mounting said head stack assembly in said fixture such that said slider is positioned with a predetermined roll bias;
  d) providing an optical recognition means for registering optical information about said optical reference element; and
  e) processing said optical information to determine said physical placement.

15. The method of claim 14, wherein said alignment is lithographically controlled.

16. The method of claim 14, wherein said optical reference element is deposited by sputtering.

17. The method of claim 14, wherein said optical recognition means is a video camera and said step of registering said optical information comprises taking a still image of said slider and converting said still image into a linear expression of electronic data.

18. The method of claim 17, wherein said linear expression is computerized compared to at least one control parameter with an analyzing algorithm.

19. The method of claim 18, wherein at least one of said control parameters is derived from a reference edge.

20. The method of claim 18, wherein said analyzing algorithm analyzes said still image in two steps, whereby the first step is applied to determine a narrow analyzing area for the second step with an imposed high precision algorithm.

* * * * *